Patented Feb. 20, 1934

1,947,504

UNITED STATES PATENT OFFICE 1,947,504

CEMENT PRODUCT AND METHOD OF MAKING THE SAME

Howard R. Starke, Riverside, Calif., assignor to Riverside Cement Company, Los Angeles, Calif., a corporation of Delaware No Drawing. Application April 20, 1931
Serial No. 531,639

26 Claims. (Cl. 106—25)

This invention relates to a cement product or composition consisting principally of Portland cement, together with certain proportions of added materials, and to the method of making such a cement product or composition.

In general, the principal objects of this invention are to provide a cement product possessing advantageous properties and to provide an advantageous method of manufacturing such a product at a minimum cost.

An important object of the invention is to provide a cement product having improved properties such as greater plasticity, increased sand carrying capacity, and a much higher degree of workability than ordinary Portland cement, together with highly satisfactory strength and durability after setting. Such improved properties are believed to be due in part directly to the presence of certain materials which are added to the cement material proper in the process of manufacture, as hereinafter described, and in part to a greater fineness or specific surface, or a more advantageous particle size distribution, resulting from such process of manufacture. Inasmuch as the admixture of the above-mentioned additional materials and the grinding of the cement in the presence of such materials has been found to contribute very materially to the obtaining of the desired fineness, specific surface, or particle size distribution, it is evident that such added materials are very largely responsible, either directly or indirectly, for the improved properties of the finished product.

A further object of the invention is to provide a Portland cement product having an advantageous particle size distribution, and particularly a product having an unusually high proportion, by weight, of particles of intermediate sizes, for example between 10 and 30 microns diameter, it having been found that this abundance of intermediate size particles constitutes a distinct superiority over the normal size distribution of ordinary Portland cement, as is explained more fully hereinafter.

A further object of the invention is to provide a novel process by which Portland cement products having advantageous properties of fineness or specific surface may be produced with a minimum time of grinding, expenditure of power, and hence at minimum cost. Practical advantages may thus be gained, either in the manufacture of a product of increased fineness or specific surface without increasing the duration or power consumption of the grinding operation, or in a reduction of the time and power required to produce a product having a certain fineness or specific surface, or in both of these ways. It is well known that increasing the fineness or specific surface of Portland cement leads to marked improvements in the properties thereof, for example by enhancing the working properties of the cement, such as plasticity, workability, sand carrying capacity, etc., or by improving the properties of cementitious or concrete bodies formed therewith, such as mechanical strength, durability, imperviousness to water and other fluids, etc. It is obviously of advantage, therefore, to provide means whereby relatively high fineness and specific surface may be combined with relatively low cost of grinding.

A particular object of the invention is to produce a cement product having a substantially lower proportion of material above a certain particle size, for example above 40 or 50 microns diameter, than is present in the normal Portland cements heretofore produced commercially, without requiring grinding of the clinker for a period materially exceeding the time usually required for grinding normal Portland cement to the ordinary degree of fineness.

A further object is to provide for manufacture of a Portland cement product of normal fineness or specific surface, with a materially shorter time of grinding and a consequent considerable saving in energy over that heretofore required to produce such normal fineness or specific surface.

A further object of the invention is to eliminate coating of the grinding media and the walls of the grinding apparatus with ground material, thus maintaining the grinding media and grinding apparatus at uniformly high efficiency. This may be regarded as an important factor in the high efficiency of grinding obtainable by this invention, which, as above stated, may be reflected either in improved properties of the product or in a reduction of the cost of grinding, or both. Furthermore, the temperature of the material during grinding does not rise as high as it ordinarily would, due to the fact that a greater weight of material may be passed through the mill in a given unit of time, and the total energy turned into heat during this unit of time is thus distributed over a larger mass of material. This decrease in the temperature to which the material is heated during grinding still further improves the properties of the finished product, and particularly the setting properties thereof. Also, the prevention of coating eliminates the necessity of periodically interrupting the grinding operation for the purpose of removing the coating of finely ground material which, under ordinary conditions, tends to form on both the mill lining and the grinding media.

The product of the present invention comprises a finely ground mixture containing Portland cement, together with a very small proportion of oleaginous material such as a fatty acid, preferably oleic acid, interground therewith, said mixture containing a relatively small proportion of particles exceeding about 40 or 50 microns in diameter and a relatively high proportion of particles of an intermediate size range, for example, about 10 to 30 microns in diameter. Said product may, advantageously, also contain a suitable proportion of inert mineral material other than Portland cement material also interground therewith, which mineral material acts, in part at least, as a carrier or distributing agent for the oleic acid or other oleaginous material, the additional use of such inert mineral material forming the subject-matter of my application Serial No. 650,165 filed January 4, 1933, which is a continuation-in-part of this application.

The term "oleic acid" as used herein is understood to include either pure or commercial oleic acid, and in general any material consisting principally of oleic acid, for example, the material known commercially as "red oil" and containing oleic acid together with varying amounts of other fatty acids or other impurities. Only a very small proportion of oleic acid or other oleaginous material is preferably used in accordance with this invention, as I have found that for the purposes above mentioned the use of a small proportion thereof produces much better results than are obtained by the use of increased amounts thereof. The proportion of such material used should be between .05% and 1% of the total product, and preferably between 0.1% and 0.5%. For example, I have found that with the Portland cement on which tests have been made very advantageous results are obtained by the addition of about .15% of oleic acid alone.

Instead of oleic acid I may use other fatty acids, such as butyric acid. Examples of other oleaginous materials which may be used are the fatty oils, such as cottonseed oil or cocoanut oil.

As stated above, I may also add an inert mineral carrier or distributing agent such as sand or other siliceous material, or limestone. Such carrier or distributing agent may be added up to 30% or more of the total weight of the product, but the proportion of this material is preferably between 5 and 20%, and I have found that particularly good results are obtained by the use of approximately 15% of said material.

It will be understood that the product may also contain any other added ingredients such as are commonly used for controlling the setting time or other properties of the cement, such as gypsum or other calcium sulfate compound. While the use of such other ingredients is not essential and does not constitute a part of this invention, it may be said that in general I prefer to add to the cement, before grinding, gypsum in the amount of from 1 to 5% by weight of the finished product.

It is an essential feature of this invention that the Portland cement be finely interground with the added oleic acid or other oleaginous material, and for this purpose said oleic acid, or other oleaginous material, together with the inert mineral carrier in case the latter is used, is mixed with the clinker prior to the completion of the grinding thereof and the mixture is interground to the desired fineness. The added material may be incorporated with the unground Portland cement clinker formed in the usual manner and then ground therewith, or may be added to partially ground clinker before the final grinding thereof to the desired fineness.

I may also find it advantageous to mix the oleic acid or other oleaginous material with an inert mineral carrier and cause the same to be thoroughly distributed therein prior to the mixing of these materials with the Portland cement.

In applying the invention to the manufacture of a product having improved properties due to increased fineness or specific surface, the mixture of cement and added materials is ground to a higher degree of fineness or specific surface than ordinary Portland cement, and is preferably subjected to a grinding operation of such nature and duration that the percentage of relatively coarse particles is lower than in any cement heretofore known commercially. Analyses of the fineness or particle size of certain cement products produced in accordance with this invention, such analyses being made by methods based on the rate of settling thereof, as hereinafter described, have indicated that such products contain materially less than 1% of particles exceeding 50 microns in diameter, and materially less than 5% of particles exceeding 40 microns in diameter, whereas normal Portland cements heretofore produced commercially have ordinarily contained upwards of 10% of particles above 50 microns in diameter and upwards of 20% of particles above 40 microns in diameter. Calculation of the specific surface of a number of these products have shown them to have specific surface values of over 2100 sq. cm. per gm., and in some cases over 2200 sq. cm. per gm.

Normal Portland cements are usually defined as to particle size by the expression "percent passing through a 200 mesh screen." The diameter of the openings in a 200 mesh screen is 0.074 mm. or, more properly stated, 74 microns. Thus, in the hereunto attached tables, the expression "+74 microns" denotes material which will not pass through a 200 mesh screen, and the expression "—74+60 microns" denotes material passing through a 200 mesh screen but no smaller than 60 microns in diameter, and so forth.

On the other hand, in applying this invention to the production of cement products of normal fineness or particle size, the time of grinding of the mixture of cement material and added material, in a mill of any given size and suitable type, may be much shorter than in ordinary methods, as will be evident from the data tabulated hereinafter, and the power consumption is correspondingly reduced.

It has been found, however, that cement products made in accordance with this invention, whether ground to normal or increased fineness or specific surface, uniformly contain a larger percentage of their weight in particles of intermediate sizes, and particularly, of particles between 10 and 30 microns in diameter. In general, the cement products of my invention contain materially in excess of 40% by weight of particles between 10 and 30 microns in diameter, whereas a considerable number of Portland cements heretofore produced, when analyzed by the same methods, were all found to contain materially less than 40% by weight of particles within this range. This increase in proportion of particles within this intermediate size range, resulting in a lowered proportion of relatively low strength coarser particles and also avoiding excessive production of the extremely fine particles whose formation requires expenditure of power out of all proportion to the increased strength imparted thereby, is of distinct advantage in producing a cement having an optimum combination of strength, plasticity and other properties with a low power requirement for grinding.

In an article on "The influence of the fine particle structure on the strength properties of Portland cement," in Zement, Vol. 19, pages 607—8 (1930), Dr. Hans Kuhl shows that a cement of intermediate particle size, say from about 30 microns down to 15 microns, gives the greatest ratio of strength to specific surface, and the significance of this is readily apparent if it is borne in mind that specific surface values afford an accurate measure of power consumption in grinding. As the particle size increases above 30 microns, the strength decreases more rapidly than does the specific surface or power expenditure. On the other hand, it is shown by Kuhl to be quite uneconomical to grind to particle sizes below 10 microns, as in this range the specific surface and power expenditure increase much more rapidly than does the strength.

An example of a preferred method of making a cement composition in accordance with this invention is as follows: 0.35 parts by weight of oleic acid is mixed with 15 parts by weight of sand and these ingredients are thoroughly intermixed with one another and then added to Portland cement clinker, preferably with a suitable percentage of gypsum, in sufficient total amount to make 100 parts by weight of finished product. For example, I may use 3.5 parts by weight of gypsum and 81.15 parts by weight of Portland cement clinker. The mixture is then ground in a ball mill or other suitable grinding apparatus, for a suitable period of time, until the desired fineness of product is attained. No exact time of grinding can be specified, as this will depend upon the type of grinding apparatus and the speed of operation thereof, as well as other factors, but it may be said that when grinding in a small laboratory size ball mill, grinding of this mixture for 4000 revolutions has been found to give a product of equal or greater fineness or specific surface than the product obtained by grinding a batch of the same clinker, without the oleaginous material, for 7000 revolutions, and that by grinding the cement with the said mixed materials for 7000 revolutions a very much greater degree of fineness was obtained.

In order to illustrate the effect of the addition of oleaginous material and inert mineral carrying material on the fineness of the ground product, a series of tests were made in which different percentages of oleic acid and, in some cases, of sand, were added to portions of the same batch of Portland cement clinker and the clinker then ground in a laboratory size ball mill. Gypsum was also added in each case in the proportions given. In Table No. 1 below, the period of grinding was uniform throughout, and the grinding mill used, as well as other conditions of grinding, were essentially the same, except for the presence of the different quantities of added materials. The time of grinding was also kept constant in all of these tests, so as to determine more particularly the increase in fineness or specific surface, and the decrease in mill coating obtainable by the addition of the oleaginous material and the inert mineral material. In each case the tendency of the ground material to coat the grinding balls was measured by determining the weight of the material which had adhered to the balls. The percentage of the original charge so adhering was calculated and reported in the table as percentage ball coating. The ground material was then analyzed for fineness by measuring the rate of settling or sedimentation thereof in a suitable liquid medium, employing an apparatus such as shown in patent to Robert T. Knapp No. 1,838,628, and the percentages of material within certain ranges of particle diameter, as well as the total specific surface of the material, in square centimeters per gram, were calculated in accordance with the principles and mathematical analysis discussed in "Chemistry of the Colloidal State" by John C. Ware, Chapter II.

The term "specific surface" designates the total surface area of all the particles contained in a unit mass of the material having the average particle size distribution as calculated from the rate of settling in the above apparatus. The table also shows the total percentage by weight of each product above 50 microns, the total percentage above 40 microns, and the total between 10 and 30 microns.

Table No. I

| Identification of product | A | B | C | D | E | F | G | H |
|---|---|---|---|---|---|---|---|---|
| Description of product | Clinker +3.5% gypsum | Clinker +3.5% gypsum +0.15% oleic acid | Clinker +3.5% gypsum +0.35% oleic acid | Clinker +3.5% gypsum +0.60% oleic acid | Clinker +3.5% gypsum +15% sand | Clinker +3.5% gypsum +15% sand+ 0.15% oleic acid | Clinker +3.5% gypsum +15% sand+ 0.35% oleic acid | Clinker +3.5% gypsum +15% sand+ 0.60% oleic acid |
| Mill revolutions | 7000 | 7000 | 7000 | 7000 | 7000 | 7000 | 7000 | 7000 |
| % ball coating | 5.0 | 1.4 | 0.0 | 0.0 | 2.6 | 2.3 | 0.0 | 0.0 |
| Particle diameter: | | | | | | | | |
| % +74 mircons | 3.5 | 0.2 | 0.2 | 0.1 | 1.0 | 0.1 | 0.1 | 0.1 |
| %−74+60 do | 3.9 | 0.0 | 0.0 | 0.0 | 2.0 | 0.0 | 0.0 | 0.0 |
| %−60+50 do | 6.8 | 0.0 | 0.0 | 2.5 | 3.9 | 0.0 | 0.0 | 0.0 |
| %−50+40 do | 9.7 | 1.8 | 1.8 | 3.5 | 8.4 | 0.9 | 0.9 | 0.9 |
| %−40+30 do | 10.6 | 8.0 | 5.0 | 8.0 | 11.4 | 7.0 | 4.0 | 7.5 |
| %−30+25 do | 7.2 | 8.0 | 6.0 | 7.0 | 7.4 | 7.5 | 5.5 | 6.0 |
| %−25+20 do | 7.2 | 11.0 | 9.5 | 9.0 | 9.4 | 11.0 | 9.0 | 9.5 |
| %−20+15 do | 8.7 | 12.5 | 13.0 | 11.5 | 8.9 | 12.5 | 14.5 | 12.5 |
| %−15+10 do | 9.6 | 14.5 | 16.0 | 14.5 | 11.9 | 14.0 | 17.5 | 16.0 |
| %−10+8 do | 5.8 | 7.5 | 8.5 | 8.5 | 4.0 | 5.0 | 7.5 | 7.0 |
| %−8 do | 27.0 | 36.5 | 40.0 | 36.0 | 31.7 | 42.0 | 41.0 | 40.5 |
| Total %+50 do | 14.2 | 0.2 | 0.2 | 2.6 | 6.9 | 0.1 | 0.1 | 0.1 |
| Total %+40 do | 23.9 | 2.0 | 2.0 | 6.1 | 12.3 | 1.0 | 1.0 | 1.0 |
| Total %−30+10 do | 32.7 | 46.0 | 44.5 | 42.0 | 37.6 | 45.0 | 46.5 | 44.0 |
| Specific surface (sq. cm. per gm.) | 1593 | 2043 | 2175 | 2021 | 1787 | 2198 | 2243 | 2195 |

It will be seen from the above table that each of the cement products B, C, D, F, G and H, which were ground in the presence of added oleic acid, had a materially greater fineness and a materially higher specific surface than the cement products A and E, which were ground in the absence of such added material. It will also be noted that the cement product E, which was ground in the presence of added sand, without oleic acid, had a greater fineness and higher specific surface than the cement product A, which was ground without either sand or oleic acid, but that the further addition of oleic acid along with the sand, as in F, G and H, again produced increased fineness and higher specific surface. Furthermore, for a given percentage of oleic acid, a greater degree of fineness and a higher specific surface were obtained in the products which also contained added sand than in the products which did not contain sand; for example, product G had a greater fineness and specific surface than product C. The specific surface of a cement product has been found to afford a fairly accurate indication as to the plasticity, workability, and sand carrying capacity of the cement as well as the strength of cementitious bodies formed therewith, and it is evident therefore that the cement product C, having a specific surface of 2175 sq. cm. per gm., as obtained by the use of .35% oleic acid, and the cement product G, having a specific surface of 2243 sq. cm. per gm., as obtained by the use of 15% sand and .35% oleic acid should be decidedly superior to the cement product A having a specific surface of only 1593 sq. cm. per gm., as obtained by grinding the same clinker without either of these added materials. This superiority has been borne out in practice and it has been found that these cements of high specific surface, produced in accordance with this invention by grinding for approximately the same period of time or the same number of mill revolutions as is required to produce normal Portland cement of ordinary fineness, possess much greater plasticity, workability, and sand-carrying capacity than are possessed by such normal Portland cement of ordinary fineness.

It will also be noted from the above table that the cement products B and C, ground with .15% oleic acid and with .35% oleic acid respectively, as well as products F, G and H, ground with each of the three different percentages of oleic acid and sand, each contained materially less than 1% of particles exceeding 50 microns in diameter, and materially less than 5% of particles exceeding 40 microns in diameter, and the presence of this minimum proportion of these relatively coarse particles is considered as constituting an important feature of novelty of this invention. Products A and D, containing no added oleaginous material, showed proportions of particles above these sizes far in excess of these figures. Furthermore, it will be noted that product G, which represents a preferred embodiment of the invention, had a specific surface exceeding 2200 sq. cm. per gm.

Also, products A and E, containing no added oleaginous material, had less than 40% of their weight between 10 and 30 microns, while all of the other products exceeded this percentage between these limits.

Some tests were also made to illustrate more particularly the effect of the added oleaginous material, with or without sand, in reducing the time of grinding required to secure a product of a given degree of fineness and specific surface, and to also further illustrate the advantageous particle size distribution resulting from the addition of such material. The preparation of the samples and the determination of the fineness and specific surface thereof were conducted substantially as above described with the exception that the number of revolutions of the grinding mill was varied in different tests. The results of these tests, together with the number of mill revolutions in each case are given below in tables II and III. The products listed in table II were made from a different batch of clinker than the products listed in table III, so that the results of one table are not comparable with those of the other.

Table No. II

| Identification of product | K | L | M |
|---|---|---|---|
| Description of product | Clinker +3.6% gypsum | Clinker +3.6% gypsum +0.15% oleic acid | Clinker +3.6% gypsum +0.15% oleic acid |
| Mill revolutions | 7000 | 7000 | 4000 |
| Particle diameter: | | | |
| % +74 microns | 3.3 | 0.0 | 0.5 |
| %−74+60 do | 3.9 | 0.0 | 1.5 |
| %−60+50 do | 7.7 | 0.0 | 3.0 |
| %−50+40 do | 7.7 | 2.0 | 6.0 |
| %−40+30 do | 11.6 | 6.0 | 13.5 |
| %−30+25 do | 6.8 | 8.5 | 9.5 |
| %−25+20 do | 8.2 | 12.5 | 10.0 |
| %−20+15 do | 8.2 | 13.0 | 12.5 |
| %−15+10 do | 9.2 | 14.5 | 12.0 |
| %−10+ 8 do | 4.8 | 7.0 | 6.0 |
| %− 8+ 7 do | 5.8 | 8.5 | 7.5 |
| %− 7+ 6 do | 3.9 | 5.5 | 6.0 |
| %− 6+ 5 do | 9.7 | 9.5 | 5.5 |
| %− 5+ 4 do | 1.9 | 4.0 | 0.5 |
| %− 4+ 3 do | 5.8 | 4.5 | 3.0 |
| %− 3 do | 1.5 | 4.5 | 3.0 |
| Total % +50 do | 14.9 | 0.0 | 5.0 |
| Total % +40 do | 22.6 | 2.0 | 11.0 |
| Total % −30+10 do | 32.4 | 48.5 | 44.0 |
| Specific surface (sq. cm. per gm.) | 1718 | 2210 | 1700 |

Table No. III

| Identification of product | N | O | P | Q |
|---|---|---|---|---|
| Description of product | Clinker +3.5% gypsum +15% sand | Clinker +3.5% gypsum +15% sand | Clinker +3.5% gypsum +15% sand +0.15% oleic acid | Clinker +3.5% gypsum +15% sand +0.35% oleic acid |
| Mill revolutions | 7000 | 10500 | 4000 | 7000 |
| % ball coating | 2.4 | 4.3 | 0.0 | 0.0 |
| Particle diameter: | | | | |
| % +74 microns | 2.0 | 0.3 | 0.8 | 0.2 |
| %−74+60 do | 1.0 | 1.7 | 0.0 | 0.0 |
| %−60+50 do | 4.4 | 3.5 | 0.2 | 0.0 |
| %−50+40 do | 10.8 | 6.5 | 5.0 | 0.8 |
| %−40+30 do | 11.3 | 11.5 | 11.5 | 5.0 |
| %−30+25 do | 7.8 | 6.5 | 8.5 | 5.5 |
| %−25+20 do | 7.8 | 7.5 | 12.0 | 10.5 |
| %−20+15 do | 9.3 | 10.0 | 13.0 | 13.5 |
| %−15+10 do | 10.3 | 11.0 | 14.0 | 17.0 |
| %−10+ 8 do | 5.4 | 5.0 | 5.5 | 8.5 |
| %− 8 do | 29.9 | 36.5 | 29.5 | 39.0 |
| Total %+50 do | 7.4 | 5.5 | 1.0 | 0.2 |
| Total %+40 do | 18.2 | 12.0 | 6.0 | 1.0 |
| Total %−30+10 do | 35.2 | 35.0 | 47.5 | 46.5 |
| Specific surface (sq. cm. per gm.) | 1730 | 1945 | 1808 | 2185 |

From Table II it is again seen that grinding for 7000 revolutions in the presence of 0.15% oleic acid gave a product of much greater fineness and specific surface than the same grinding period without the oleic acid, and it is also seen that a fineness and specific surface comparable to that obtained with 7000 mill revolutions without oleic acid were obtained with a grinding of only 4000 mill revolutions when the mixture contained 0.15% oleic acid. The addition of this small amount of oleic acid resulted therefore in a reduction of about 43% in the time and also in the power cost of grinding, for equal specific surface of the product.

From Table III it is evident that grinding for 4000 mill revolutions with 0.35% oleic acid in addition to 15% sand gave a product of greater fineness and specific surface than was obtained by grinding for 7000 mill revolutions with 15% sand but with no oleic acid, and also that grinding of 7000 mill revolutions with 0.35% oleic acid in addition to 15% sand gave a product having a greater fineness and specific surface than was obtained by grinding for 10,500 mill revolutions with the same proportion of sand but with no oleic acid.

Also, in Tables II and III, the above mentioned important difference in particle size distribution may be noted between the products ground with added oleaginous material and those ground without. All of the former, except products M and P which were ground for only 4000 revolutions, contained materially less than 1% of particles exceeding 50 microns in diameter and materially less than 5% of particles exceeding 40 microns in diameter, while those ground without oleaginous material invariably exceeded these amounts, even in the case of product O, which was ground for 10,500 revolutions in Table II. Furthermore, the products ground with oleaginous material again all contained materially in excess of 40% by weight of particles between 10 and 30 microns and those ground without such material contained materially less than 40% within this range. This latter feature of the invention may be particularly well illustrated by comparing product M, ground for 4000 revolutions with oleaginous material, having a specific surface of 1700 sq. cm. per gm., and containing 44.0% within this range, and product K, ground for 7000 revolutions without such added material and having practically the same specific surface, but containing only 32.4% within this range.

A similar comparison may be made between products N and P, or between products O and Q while a still more striking comparison may be made between products O and P. The former, ground for 10,500 revolutions without oleaginous material, had a specific surface of 1945 sq. cm. per gm., but contained only 35.0% within this advantageous intermediate range, while the latter, ground for only 4000 revolutions with added oleaginous material, had a somewhat lower specific surface but contained 47.5% within this range. It is evident, therefore, that the addition of the oleaginous material results in an increased proportion of material within the range of particle size where the greatest advantages are gained in ratio of strength to power expenditure, and that this is true regardless of the average fineness, or specific surface, to which the entire product is ground.

That the above-mentioned high proportion of particles between 10 and 30 microns diameter, namely, more than 40%, actually constitutes a new feature of the invention, is further evidenced by the fact that a determination of particle size distribution in seven different brands of commercial Portland cement now on the market, including several high early strength cements, showed all of them to contain less than 40% of particles within this range. The actual figures for these cements ranged from 31.9% to 38.5%.

Table No. IV given below shows the results obtained by the use of other oleaginous materials, including another fatty acid and two fatty oils, which were in each case added to the Portland clinker and ground therewith in substantially the manner above described. The data in this table indicate that butyric acid and cottonseed oil give results which are substantially equivalent to those obtained with oleic acid, and that cocoanut oil also gives some at least of the same advantages, as to fineness, specific surface, and particle size distribution.

*Table No. IV*

| Kind of oleaginous material added | None | Butyric acid | | Cottonseed oil | | Cocoanut oil | |
|---|---|---|---|---|---|---|---|
| % Added | 0 | 0.15 | 0.35 | 0.15 | 0.35 | 0.15 | 0.35 |
| Mill revolutions | 7000 | 7000 | 7000 | 7000 | 7000 | 7000 | 7000 |
| % Ball coating | 2 | 0.0 | 0.0 | 0 | 0 | 0 | 0 |
| Particle diameter: | | | | | | | |
| % +74 microns | 1.0 | 0.5 | 0.5 | 0.0 | 0.0 | 0.0 | 0.1 |
| % −74+60 do | 2.0 | 0.0 | 0.0 | 0.0 | 0.0 | 2.5 | 3.0 |
| % −60+50 do | 4.5 | 0.0 | 0.0 | 0.0 | 0.0 | 0.0 | 0.5 |
| % −50+40 do | 11.4 | 0.0 | 0.0 | 3.0 | 2.0 | 0.5 | 1.0 |
| % −40+30 do | 11.4 | 4.5 | 2.0 | 4.5 | 6.0 | 4.0 | 4.5 |
| % −30+25 do | 6.4 | 6.0 | 4.5 | 6.5 | 7.0 | 5.5 | 5.5 |
| % −25+20 do | 8.4 | 11.0 | 8.0 | 10.5 | 9.5 | 9.5 | 9.0 |
| % −20+15 do | 9.4 | 14.0 | 15.0 | 12.5 | 12.5 | 14.0 | 12.0 |
| % −15+10 do | 11.4 | 18.0 | 18.5 | 16.0 | 15.0 | 16.0 | 15.0 |
| % −10+ 8 do | 4.9 | 8.0 | 7.5 | 7.5 | 9.0 | 8.0 | 8.5 |
| % − 8 do | 29.2 | 38.0 | 44.0 | 39.5 | 39.0 | 40.0 | 41.0 |
| Total %: | | | | | | | |
| +50 do | 7.5 | 0.5 | 0.5 | 0.0 | 0.0 | 2.5 | 3.6 |
| +40 do | 18.9 | 0.5 | 0.5 | 3.0 | 2.0 | 3.0 | 4.6 |
| −30+10 do | 35.6 | 49.0 | 46.0 | 45.5 | 44.0 | 46.0 | 41.5 |
| Specific surface (sq. cm. per gm.) | 1695 | 2135 | 2309 | 2149 | 2147 | 2173 | 2184 |

It is quite evident, therefore, that the nature and magnitude of the effect produced by the addition of the oleaginous material is remarkable, particularly in view of the very minute proportion of such material required to produce this effect. While I am uncertain as to the exact physical nature of the phenomenon on which this action is dependent, and while this invention is not to be considered as restricted to any particular underlying theory, I am at present of the opinion that the oleaginous material exerts an electrical effect upon the cement particles, causing them to repel instead of attract each other which in turn causes them not only to act differently during the grinding operation, but also increases the ease with which the particles, when subsequently gauged with water, can be spread into thin layers. The following observed evidence is presented in support of this theory.

1. Cement thoroughly dispersed in kerosene settles rapidly by flocculation, whereas in the presence of a very small amount of oleic acid (one drop in one hundred cubic centimeters of kerosene) complete dispersion is effected, and the particles do not flocculate, but remain as individuals and settle slowly.

2. A cement ground with fifteen hundreths of one per cent of oleic acid is markedly more fluid.

3. The cement described above, in item two, is easily aerated, that is, easily filled with air so that its apparent density is greatly decreased. When pouring the cement from one container to another, an unusually large cloud of dust is produced.

4. The cement under discussion feels dry and fluffy to the touch.

5. The cement does not adhere to the grinding balls or to the walls of the mill.

Cement products produced as above described have certain characteristic properties which make them highly advantageous in use as compared with ordinary Portland cement. When gauged with water they possess unusually high plasticity and workability, and are also capable of carrying a higher proportion of sand in the mix than can ordinarily be carried without destroying the proper working characteristics, setting behavior, and strength and durability of the product after setting. These advantages are enhanced by the use of the preferred proportions of oleaginous material as above set forth, and by the grinding of the final mixture to the preferable degree of fineness and specific surface above mentioned.

I claim:

1. A cement product comprising a finely ground mixture containing materially less than 1% of particles exceeding 50 microns in diameter, said mixture consisting principally of Portland cement and containing between .05% and 1% oleaginous material interground with said Portland cement.

2. A cement product comprising a finely ground mixture containing materially less than 1% of particles exceeding 50 microns in diameter and materially less than 5% of particles exceeding 40 microns in diameter, said mixture consisting principally of Portland cement and containing between .05% and 1% oleaginous material interground with said Portland cement.

3. A cement product comprising a finely ground mixture containing materially in excess of 40% by weight of particles between 10 and 30 microns in diameter, said mixture consisting principally of Portland cement and also containing a very small proportion of added oleaginous material interground therewith.

4. A cement product comprising a finely ground mixture containing materially in excess of 40% by weight of particles between 10 and 30 microns in diameter, said mixture consisting principally of Portland cement and also containing between .05% and 1% oleaginous material interground therewith.

5. A cement product comprising a finely ground mixture containing less than 5% of particles exceeding 40 microns in diameter, said mixture consisting principally of Portland cement and also containing between .05% and 1% of oleaginous material interground with said Portland cement.

6. A cement product comprising a finely ground mixture containing materially in excess of 40% by weight of material of a particle size between 10 and 30 microns, said mixture consisting principally of Portland cement and containing a very small proportion of fatty acid interground with said Portland cement.

7. A cement product comprising a finely ground mixture containing materially in excess of 40% by weight of material of a particle size between 10 and 30 microns, said mixture consisting principally of Portland cement and also containing between .05% and 1% of fatty acid interground with said Portland cement.

8. A cement product comprising a finely ground mixture containing materially in excess of 40% by weight of material of a particle size between 10 and 30 microns, said mixture consisting principally of Portland cement and also containing a very small proportion of oleic acid interground with said Portland cement.

9. A cement product comprising a finely ground mixture containing materially in excess of 40% by weight of material of a particle size between 10 and 30 microns, said mixture consisting principally of Portland cement and also containing between .05% and 1% of oleic acid interground with said Portland cement.

10. The method of making a cement product which comprises intimately mixing between .05% and 1% of oleic acid with Portland cement clinker and grinding the mixture to form a product containing material in excess of 40% by weight of material of a particle size between 10 and 30 microns.

11. The method of making a cement product which comprises intimately mixing a very small proportion of oleaginous material with Portland cement clinker and grinding the mixture to form a product containing materially in excess of 40% by weight of particles between 10 and 30 microns in diameter.

12. The method of making a cement product which comprises intimately mixing between .05% and 1% of fatty acid with Portland cement clinker and grinding the mixture to form a product containing materially in excess of 40% by weight of particles between 10 and 30 microns in diameter.

13. The method of making a Portland cement product which comprises preparing an intimate mixture consisting principally of Portland cement clinker and containing between .05% and 1% of oleaginous material, and grinding said mixture until the ground product contains less than 1% of particles exceeding 50 microns in diameter.

14. The method of making a Portland cement product which comprises preparing an intimate mixture consisting principally of Portland cement and containing between .05% and 1% of oleic acid thoroughly distributed therein and grinding said mixture until the ground product contains less than 1% of particles exceeding 50 microns in diameter.

15. The method of making a Portland cement product which comprises preparing an intimate mixture consisting principally of Portland cement and containing between .05% and 1% of fatty acid thoroughly distributed therein, and grinding said mixture until the ground product contains materially less than 1% of particles exceeding 50 microns in diameter and materially less than 5% of particles exceeding 40 microns in diameter.

16. A cement product comprising a finely ground mixture containing materially in excess of 40% by weight of material of a particle size between 10 and 30 microns, said mixture consisting principally of Portland cement and also containing an inert mineral material other than Portland cement and between .05% and 1% of oleaginous material, said inert mineral material and oleaginous material being interground with said Portland cement.

17. A cement product comprising a finely ground mixture containing less than 1% of particles exceeding 50 microns in diameter, said mixture consisting principally of Portland cement and also containing an inert mineral material other than Portland cement and a very small proportion of fatty acid, said inert mineral material and fatty acid being interground with said Portland cement.

18. A cement product comprising a finely ground mixture containing materially in excess of 40% by weight of particles between 10 and 30 microns in diameter, said mixture consisting principally of Portland cement and also containing an inert mineral material other than Portland cement and a very small proportion of oleaginous material, said inert mineral material and oleaginous material being interground with said Portland cement.

19. A cement product comprising a finely ground mixture containing materially in excess of 40% by weight of particles between 10 and 30 microns in diameter, said mixture consisting principally of Portland cement and also containing between 5 and 20% by weight of inert mineral material other than Portland cement and between .05% and 1% of fatty acid, said inert mineral material and said fatty acid being interground with said Portland cement.

20. A cement product comprising a finely ground mixture containing materially in excess of 40% by weight of material of a particle size between 10 and 30 microns, said mixture consisting principally of Portland cement and also containing at least 5% of an inert mineral material other than Portland cement and between .05% and 1% of oleaginous material, said inert mineral material and oleaginous material being interground with said Portland cement.

21. A cement product comprising a finely ground mixture containing materially in excess of 40% by weight of material of a particle size between 10 and 30 microns, said mixture consisting principally of Portland cement and also containing between 5% and 20% of an inert mineral material other than Portland cement and a very small proportion of oleaginous material, said inert mineral material and oleaginous material being interground with Portland cement.

22. A cement product comprising a finely ground mixture containing materially in excess of 40% by weight of material of a particle size between 10 and 30 microns, said mixture consisting principally of Portland cement and also containing between 5% and 20% of an inert mineral material other than Portland cement and between .05% and 1% of oleic acid, said inert mineral material and oleic acid being interground with said Portland cement.

23. The method of making a cement product which comprises intimately mixing Portland cement clinker, inert mineral material other than Portland cement material, and a very small proportion of oleaginous material, and grinding said mixture to form a product containing materially in excess of 40% by weight of particles between 10 and 30 microns in diameter.

24. The method of making a Portland cement product which comprises preparing an intimate mixture consisting principally of Portland cement clinker and containing between 5 and 20% by weight of inert mineral material other than Portland cement material and between .05% and 1% fatty acid, and grinding said mixture to form a product containing materially in excess of 40% by weight of particles between 10 and 30 microns in diameter.

25. The method of making a Portland cement product which comprises intimately mixing Portland cement clinker, inert mineral material other than Portland cement material, and a very small proportion of oleaginous material, and grinding said mixture until it contains materially less than 1% of particles exceeding 50 microns in diameter.

26. The method of making a Portland cement product which comprises mixing oleaginous material with an inert mineral material other than Portland cement, adding the resulting mixture to Portland cement clinker and mixing the same to cause the inert mineral material and oleaginous material to be thoroughly distributed and admixed with said Portland cement clinker, the proportion of oleaginous material in the mixture resulting from the last-named step being between .05% and 1% of the total, and then grinding said mixture until it contains less than 1% of particles exceeding 50 microns in diameter.

HOWARD R. STARKE.